United States Patent [19]
Winter et al.

[11] 3,805,869
[45] Apr. 23, 1974

[54] APPARATUS FOR THE PREPARATION OF EMULSIFIER-CONTAINING POLYVINYL CHLORIDE OR VINYL CHLORIDE COPOLYMER POWDERS

[75] Inventors: Hermann Winter, Marl; Manfred Smolinski, Rhade; Hans-George Wolf; Harry Roll, both of Marl; Kurt Hoffmann, Recklinghausen; Helmut Jacob, Marl, all of Germany

[73] Assignee: Chemische Werke Huls Aktiengesellschaft, Marl, Germany

[22] Filed: Nov. 20, 1972

[21] Appl. No.: 307,946

Related U.S. Application Data
[63] Continuation-in-part of Ser. No. 288,972, Sept. 14, 1972.

[30] Foreign Application Priority Data
Sept. 18, 1971  Germany............................ 2146753

[52] U.S. Cl............... 159/4 B, 239/398, 239/418, 239/425
[51] Int. Cl........ B01d 1/16, B05b 7/06, A62g 5/16, F23d 11/10
[58] Field of Search............. 159/3, 4 B, DIG. 10; 239/398, 418, 423, 424, 601

[56] References Cited
UNITED STATES PATENTS
| | | | |
|---|---|---|---|
| 1,302,360 | 4/1919 | Goodwin........................ | 239/424 X |
| 1,484,271 | 2/1924 | Murdock...................... | 159/4 B UX |
| 2,029,141 | 1/1936 | Warner........................ | 239/424 X |
| 2,188,506 | 1/1940 | Hall............................. | 159/4 B X |
| 2,532,711 | 12/1950 | Goddard....................... | 239/424 X |
| 3,140,675 | 7/1964 | Puhr-Westerheide.......... | 239/424 X |

FOREIGN PATENTS OR APPLICATIONS
| | | | |
|---|---|---|---|
| 206,588 | 2/1957 | Australia......................... | 159/4 B |

Primary Examiner—Jack Sofer
Attorney, Agent, or Firm—Millen, Raptes & White

[57] ABSTRACT

Uniform, finely divided powdery vinyl chloride polymer particles containing less than 2 wt. percent particles having a diameter greater than 40 $\mu$ are obtained by spray-drying an aqueous dispersion of the polymer and a carrier gas through a two-fluid atomizer into a water-evaporating atmosphere at specified rates. The resultant polymer particles exhibit improved handling properties and can be used to form improved plastisols without air separation of the particles.

2 Claims, 6 Drawing Figures

APPARATUS FOR THE PREPARATION OF EMULSIFIER-CONTAINING POLYVINYL CHLORIDE OR VINYL CHLORIDE COPOLYMER POWDERS

This application is a Continuation-in-Part of application Ser. No. 288,972, filed Sept. 14, 1972.

BACKGROUND OF THE INVENTION

The present invention relates to a process for the production of polyvinyl chloride or vinyl chloride copolymer powders containing less than 2 percent by weight of powder having a particle size of $> 40\ \mu$, by spray drying polymer dispersions using a two-fluid nozzle.

The thus-obtained synthetic resin powders are particularly suitable for the manufacture of plastisols, i.e. dispersions of synthetic resin powders in plasticizers. Plastisols are widely utilized for the production of shaped articles, e.g. in accordance with the rotational casting method, and for the production of coatings or laminated material according to the spreading technique. The plastisols are hardened by heat fusion after the shaping step.

A number of requirements must be met by the properties of the plastisols and the powders suitable for plastisol production. In order to be able to economically manufacture uniform products with smooth surfaces, the plastisols must not tend toward phase separation. For this reason, the synthetic resin powder to be dispersed must be especially uniformly finely divided. In general, such a powder should contain only minor proportions, i.e. less than 2 wt. percent and preferably less than 0.3 wt. percent of particles having a diameter above 40 $\mu$.

Furthermore, the plasticols should exhibit a maximally flat viscosity curve relating the dependence of the viscosity to the shear gradient, i.e., in an ideal case the values for paste-viscosity after one day in tables under $a$) at the shear gradient $1/10/100\ \text{sec}^{-1}$ should be the same.

Additionally, the level of the viscosity curve generally should be low.

These properties are particularly important in the processing methods most frequently employed, i.e., in rotational casting for the production of hollow articles and in the spreading method for the manufacture of imitation leathers and/or synthetic foam leathers. In addition to the viscosity properties, the so called viscosity stability of the plastisols is of importance, i.e. the pastes should not tend to thicken even after storage periods of several days or weeks.

Finally, a high bulk density is required of powders to be used in production of a plastisol. High bulk density is a prerequisite for satisfactory fluidity of the powders and results in favorable rheological behavior during silo transport. Suitable bulk densities are more than 350 g/l.

The preferred technique for producing polyvinyl chloride (PVC) powders suitable for plastisol manufacture is the spray-drying of polymer dispersions, particularly emulsifier-containing polymer dispersions. In this procedure, the PVC dispersion can be sprayed by means of a two-fluid nozzle into a drying tower. According to the state of the art, the spraying ratio is 0.7–1.5 kg of nozzle air or other carrier gas per kg of dispersion. The hot air required is introduced into the tower from the top, and the dry product is obtained at the lower end of the tower. Such a technique is described in Schubert. Viehweg, "Contributions Toward Processing Technology," Vol. 5 "Spraying Tower Technique," p. 30; publishers: Deutscher Verlag fuer Grundstoffindustrie, Leipzig (1969). It is also possible to conduct the spraying process with a single-fluid nozzle at very high pressures. There are yet other processes wherein the spraying operation is conducted so that coarse granules are initially produced. In these processes, of course, the entire material must thereafter be ground.

All of the aforementioned processes generally yield powders which have too high a proportion of coarse grains, so that the material must be additionally screened in a further processing stage. Approximately 30 percent of the powder is separated by means of an air separator. This coarse material is subsequently ground in a mill and processed as a special type or returned to the fine material. A typical processing method is described by H. Hopf in "Plastics" 49: 10(1959)

According to these above-mentioned processes, powders are obtained which do not yet satisfy the above-cited plastisol requirements. The bulk densities of these powders are too low, and the plastisols produced therefrom exhibit unsatisfactory rheological behavior; their viscosity curves are too steep, with simultaneously too high a viscosity in the lower shearing ranges and/or with too high a total level of the viscosity curve. In addition, the viscosity stability properties of such plastisols is generally only poor to fair. Typical of viscosity properties of these prior art preparations are shown in the following tables, column (1); i.e. the curve of viscosity in dependence to the shear gradient rise too steeply.

OBJECTS OF THE INVENTION

Accordingly, it is an object of this invention to provide an improved process for preparing vinyl chloride based polymer powders suitable for plastisol manufacture.

Another object of this invention is to provide a process for spray-drying vinyl chloride based polymer dispersions.

A further object of this invention is to provide an improved vinyl chloride based polymer particle composition.

Yet another object of this invention is to provide an improved vinyl chloride based polymer plastisols which exhibit improved physical properties.

Other objects and advantages of this invention will become apparent to those skilled in the art upon further study of the specification and the appended claims.

SUMMARY OF THE INVENTION

Briefly, the above and other objects of this invention are attained in one aspect by providing, in a process for preparing powdery, emulsifier-containing vinyl chloride polymer particles suitable for use in the manufacture of plastisols by spray drying an aqueous dispersion of said polymer with a carrier gas through a two-fluid atomizer into a water-evaporating atmosphere, the improvement which comprises spraying 60–150 kg/hr of said dispersion through said atomizer together with 1.6–5.0 kg of carrier gas per kg of said dispersion to form dry powdery polymer particles containing less than 2 wt. percent particles having a diameter greater than 40 μ.

BRIEF DESCRIPTION OF THE DRAWINGS

The above and other objects, features and advantages of this invention will become more fully apparent to those skilled in the art from the following detailed discussion together with the annexed Drawings, wherein like reference characters refer to like or corresponding parts throughout the several Figures, and in which.

DETAILED DISCUSSION

It has now been found, surprisingly, that the above-discussed disadvantages can be avoided by conducting the spraying process, during the spray-drying of the polymer dispersions with a two-fluid nozzle, at a spraying ratio of 1.6 to 5.0 kg of atomizing air per kg of dispersion. Preferably, the spraying operation is effected at a spraying ratio of 1.7 to 3.0 kg of atomizing air per kg of dispersion. Advantageously, nozzles are employed which spray 60–140 kg per hour, especially 80 to 100 kg per hour of dispersion.

Dispersions which can be employed for the mode of operation according to this invention are vinyl chloride homo- or copolymer dispersions produced in the usual manner by aqueous emulsion or suspension polymerization. Suitable comonomers include but are not limited to vinyl acetate, vinylidene chloride, vinyl ether, acrylonitrile, and acrylates.

The comonomer can be present in the copolymer in an amount up to 20 molar percent, preferably between 0.2 and 10 molar percent based on the copolymer.

Suitable emulsifiers are all of the emulsifiers which can be utilized for the emulsion polymerization of vinyl chloride, preferably anionic emulsifiers, e.g. alkyl sulfonates, alkyl sulfates, alkyl benzenesulfonates and salts of fatty acids with an inorganic anion.

The dispersions can contain customary emulsifying quantities of emulsifier, e.g. 2 percent by weight, but also considerably larger amounts (e.g. 3–5 percent by weight) or smaller amounts, e.g. down to 0.3 percent by weight based on the weight of the emulsion. g/l.

The solids content of the dispersions likewise ranges within customary limits e.g. 30–70 percent by weight, preferably 45–60 percent by weight based on the weight of the emulsion. The polymer powders obtained from the dispersion are characterized by containing less than 2 weight percent particles having a diameter greater than 40 μ and exhibiting a bulk density of 350 to 570 g/l.

Suitable plasticizers for preparing plastisols include but are not limited to dioctyl phthalate, dimethyl phthalate, diethyl phthalate, di-propyl phthalate, dibutyl phthalate, di-amyl phthalate, di-lauryl phthalate, butyl hexyl phthalate, butyl benzyl phthalate, di-benzyl phthalate, di-butyl sebazate, di - hexyl sebazate, Tributyl phosphate, Tri-2-athylhexylphosphate.

According to the mode of operation of this invention, powders are obtained, whose proportion of particles of > 40 μ amounts to less than 2 percent by weight, i.e. the powders are initially obtained in a fineness sufficient for the preparation of the plastisol. The average diameter of the powder particles is 5 to 20 μ.

Figure 1:
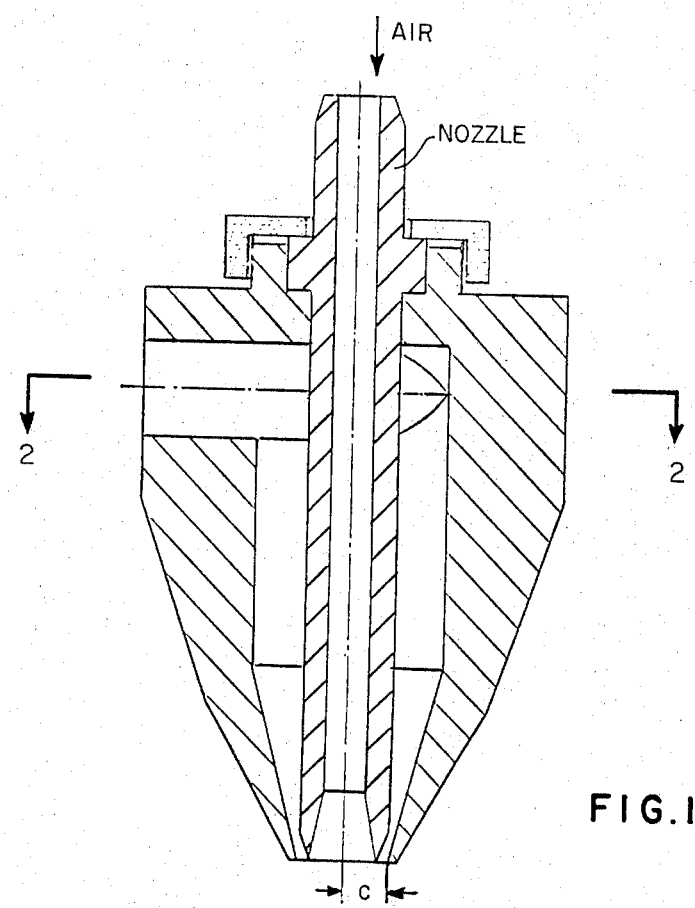
FIG. 1 is a longitudinal sectional view along the axis of a two-fluid nozzle useful in conducting the process of this invention.
Figure 2:
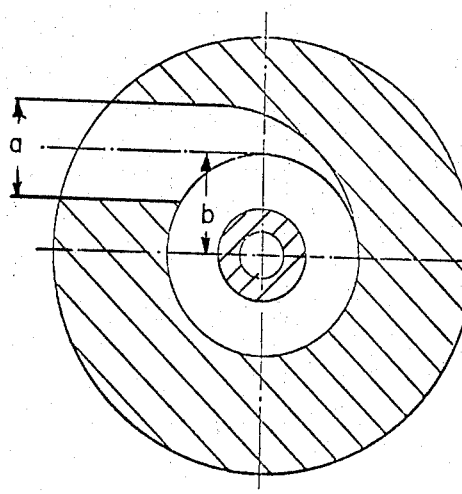
FIG. 2 is a transverse cross-sectional view of the same nozzle, taken at the horizontal polymer dispersion fluid inlet axis of FIG. 1.
Figure 3:
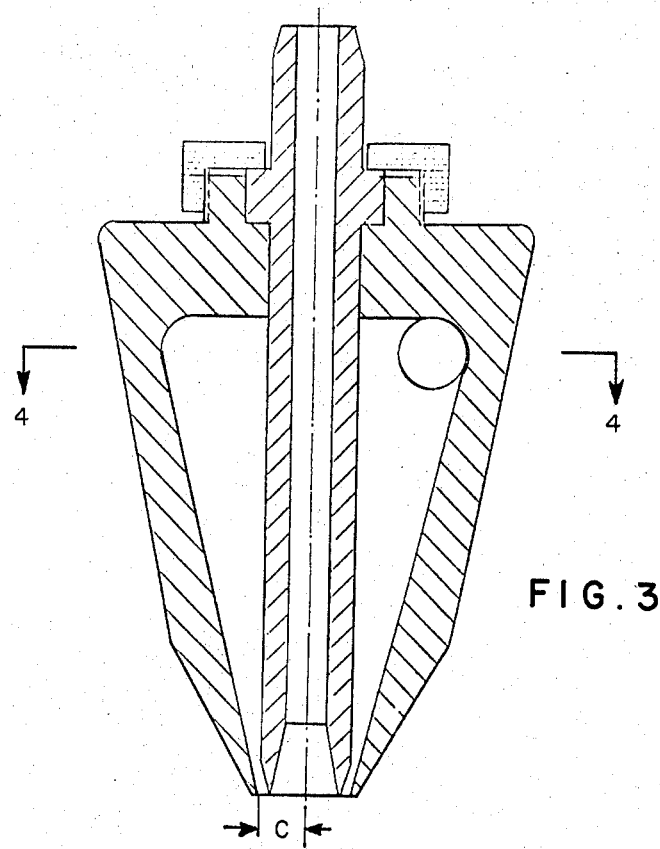
FIG. 3 presents a longitudinal sectional view along the axis of another two-fluid nozzle useful in the present invention.
Figure 4:
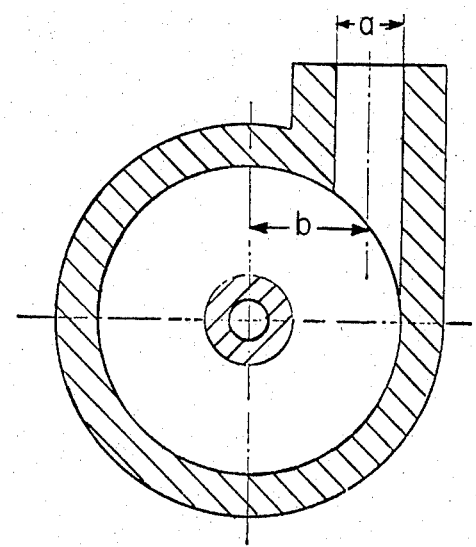
FIG. 4 presents a transverse cross-sectional view of the same nozzle, taken at the horizontal polymer dispersion fluid inlet axis of FIG. 3.
Figure 5:
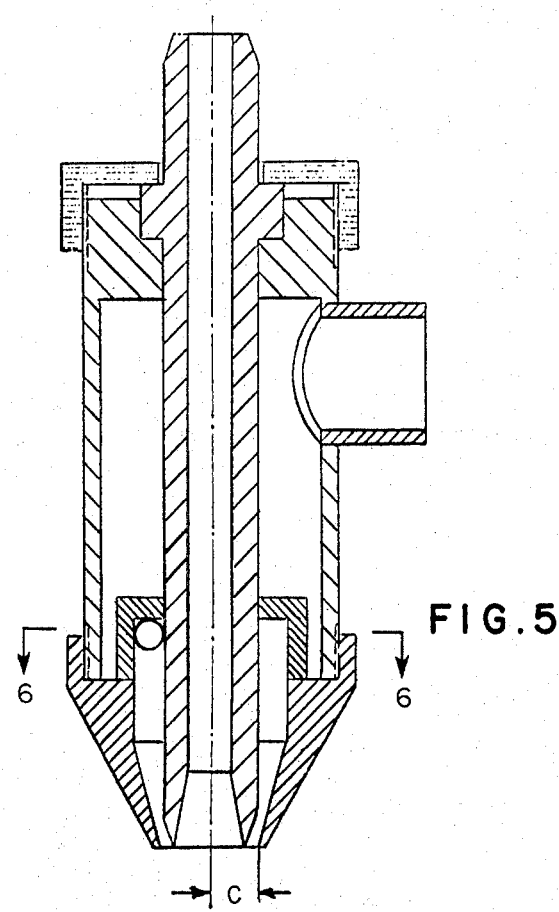
FIG. 5 is a longitudinal sectional view along the axis of yet another two-fluid nozzle useful in the present invention.
Figure 6:
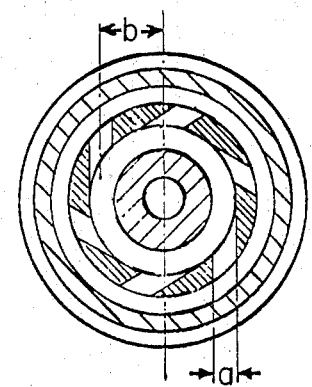
FIG. 6 is a transverse cross-sectional view taken at the horizontal polymer dispersion fluid inlet axes of FIG. 5.

Consequently, the step of air separation after spraying, necessary in accordance with prior art methods, is not carried out. It is accordingly possible to avoid damage to the surface of the grain occurring during the air separation procedure, thereby obtaining polymer powders and plastisols having improved properties.

After spray-drying, the powder is merely screened in order to eliminate impurities present from wall deposits of the spraying tower. In general, the screening step is conducted so that no more than 2 percent by weight, preferably 0.01–0.3 percent by weight, of the product is separated, e.g. using a screen of 100 to 1,000 mesh, preferably of to 300 mesh.

The spraying step is effected in spray-drying towers of conventional construction, e.g. as shown by M. Kainer, "Polyvinylchloride and Vinylchloride Copolymers," publisher: Springer-Verlag, Berlin/Heidelberg-/New York, 1965, page 51. The size of the tower is not critical and can be of any desired dimension. In general, existing industrial plants have an evaporative capacity of 500–5,000 kg. of water per hour, using a heated carrier gas such as air.

The two-fluid nozzle to be employed preferably exhibits a high atomizing capacity, since it is more advantageous for construction reasons to accommodate an only small number of nozzles in the tower. Furthermore, the servicing of a small number of nozzles is less expensive. Additionally, with nozzles of high efficiency, i.e. high output, narrow cross sections and attendant clogging are avoided. The output will vary somewhat dependent on the type of PVC dispersion, but is generally at least 60 kg of dispersion per hour, maximally 150 kg of dispersion per hour and preferably 80 to 100 kg.hr. The output of the nozzle can be controlled by varying the location of the dispersion intake level, as is known in the art.

According to this invention, the spray-drying process is conducted with a spraying ratio of 1.6 to 5.0 kg, preferably 1.7 to 3.0 kg of air per kg of dispersion. It is economically advantageous to effect the spraying within the range at as low a spraying ratio as possible, since the compressed air consumption is lowered in this manner. The optimum spraying ratio within the above-disclosed range is dependent on the physical properties of the respective dispersion, e.g. density, surface tension, viscosity, and solids content, and can be determined by a few preliminary experiments. By these experiments the location of the dispersion intake level is varied, as described above, in such a manner that powdery polymer particles with optimal structure are obtained.

FIGS. 1-6 show cross-sectional and longitudinal sectional views of two-fluid nozzles useful in conducting the process of this invention. Atomizing air is fed axially through the nozzle, while the polymer dispersion is fed tangentially through a tangential inlet pipe having a diameter $a$ shown in FIG. 2. The cross-sectional area of said inlet pipe having a diameter $a$ is larger than 80 mm$^2$, preferably 150-500 mm$^2$; the tangential inlet axis is at radial distance $b$ shown in FIG. 2, from the nozzle axis which distance is less than 40 mm., preferably 10 to 20 mm; and the outlet radius $c$ is 5 to 10 mm. The ratio between the tangential inlet radius $b$ and the outlet radius $c$ is to be between 1.5 and 4, to 1 preferably between 2 and 2.5 to 1. The housing can have a cylindrical-conical shape (FIGS. 1 and 2); a conical shape (FIGS. 3 and 4); or a cylindrical-conical configuration with tangential inlet openings for the atomizing air distributed over the circumference (FIGS. 5 and 6). The subdivision of the tangential inlet area into one or more small areas as shown in FIGS. 5 and 6 has only a minor influence on the spraying ratio and represents a modification of the above-described nozzles. The atomizer suitable for spray-drying an aqueous vinyl chloride polymer dispersion comprises:

a. a tubular air conduit having a rearward inlet half and a forward nozzle half, the inner surface of which is flared to an annular acute edge at the end of the nozzle half;

b. a tubular polymer dispersion conduit having a rearward feed portion extending to a forward nozzle portion concentrically surrounding the air conduit, the end of said nozzle portion extending axially to and concentrically spaced from the acute edge of the air conduit, the inner surface of the nozzle portion being conically tapered towards the nozzle end at least along the flared portion of the nozzle half to a circular edge having a radius to 5 to 10 mm concentrically surrounding the acute edge to form a nozzle;

c. a tubular tangential polymer dispersion inlet having a radius of less than 40 mm and a cross-sectional area of at least 80 mm$^2$, the inlet communicating tangentially with the feed portion of said polymer dispersion conduit; and d. the atomizer being further characterized by having a ratio of the radius of said tangential inlet to the radius of said nozzle of 1.5:1 to 4:1.

The feeding speed is lower than 50 m/sec., preferably 10 to 30 m/sec. The intake pressure without atomization is 80 to 160 mm Hg, preferably 120 mm Hg.

The pressure of the atomizing air is superatmospheric and generally 1 to 10 atmospheres gauge, preferably 3.0 to 5.0 atmospheres gauge.

The tower inlet temperature is 140 to 190°C, preferably 160 to 170°C, and the tower outlet temperature is 50 to 90°C, preferably 60 to 90°C. With the use of alkyl sulfate emulsifiers the tower outlet temperature is 85 to 90°C. The mixture of air-steam, on the one hand, and the dry PVC, on the other hand, is separated in the usual manner, e.g. by means of bag filters.

In technical scale plants, it is generally impossible during long operating periods to avoid caking of a small portion of the powders onto the tower wall. These cakings drop off after some time and contaminate the product. In order to avoid such a contamination of the product, the thus-obtained, dried PVC powder is screened with any customary screening device. The degree of separation of the screening machines is generally at most 2 percent, preferably 0.01 to 0.5 percent.

The advance in the art attained by the process of this invention is evident in that the step of air separation after spraying is entirely eliminated.

Furthermore, the bulk density of the thus-produced powders is considerably higher, i.e. 350 to 570, g/l and the rheological behavior of the pastes produced from the powders as described below is appreciably improved over the state of the art: Rheological behavior includes for example: level of viscosity curves, course of viscosity curves, and viscosity stability, i.e. course of viscosity curves in dependence to the time. The viscosity curves have a markedly flatter course and a level which is desirably lower.

Furthermore, the viscosity stability behavior of the pastes is improved as well, as discussed above and shown in the tables of the examples.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

In a spray tower of conventional construction having a capacity of about 200 m$^3$, 26 two-fluid nozzles are utilized. The dispersion to be sprayed has a solids content of 48 percent and an emulsifier content of 2 percent, based on the PVC. The emulsifier is an alkyl sulfonate having an average of 14 carbon atoms in the alkyl chain. The surface tension of the dispersion is 39 dyne/cm. The tower inlet temperature is 160°C, the tower outlet temperature is 65°C; the pressure of the spraying air is 3.5 atmospheres gauge; the amount of hot air is 22,000 Nm$^3$/h.; the spraying ratio is 2.3 kg of spraying air per kg of dispersion; the output per nozzle is 87 kg of dispersion per hour. The output is adjusted to the desired value by varying the intake level of the dispersion.

The dried PVC powder is screened by means of a 300 $\mu$ mesh screen, separating a coarse proportion amounting to 0.3 percent. A paste is prepared from 65 parts by weight of the thus-produced powdered PVC and 35 parts by weight of dioctyl phthalate.

In the following Table 1, column (2), $a$ indicates the paste viscosities at various shear gradients (measured in the "Haake" viscometer), $b$ indicates the paste viscosities at various shear gradients (comparable to $a$) determined after 12 days of storage; $c$ similarly denotes the viscosity stability behavior of the pastes; and $d$ represents the bulk density of the PVC powder. For purposes of comparison, column (1) sets forth the corresponding data of a PVC processed in accordance with the state of the art (by spray-drying at a spraying ratio of less than 1.5 kg of air per kg of dispersion, subsequent air separation, and grinding) and/or of the paste produced from 65 parts by weight of this powder and 35 parts of dioctyl phthalate:

TABLE 1

| | a Paste Viscosity After 1 Day | | | b Paste Viscosity After 12 Days | | | c Viscosity Stability Behavior 12/1 Days $\phi$ | d Bulk Density g./l. |
|---|---|---|---|---|---|---|---|---|
| | 1/ | 10/ | 100 sec.$^{-1}$ | 1/ | 10/ | 100 sec.$^{-1}$ | | |
| (1) | 555 | 230 | 125 | 1150 | 380 | 150 | 1.6 | 328 |
| (2) | 265 | 155 | 105 | 360 | 190 | 100 | 1.2 | 510 |

EXAMPLE 2

The procedure of Example 1 is repeated with the following variations: The dispersion contains 1.1 percent dodecyl benzenesulfonate (based on the PVC) as the emulsifier and exhibits a solids content of 46 percent by weight. The spraying ratio is 2.18 kg air/kg dispersion, and the nozzle output is 98 kg dispersion/hour.

Table 2 contains data compiled analogously to Table 1. The pastes were prepared in each case from 65 parts by weight of PVC powder and 35 parts by weight of dioctyl phthalate.

TABLE 2

| | a Paste Viscosity After 1 Day | | | b Paste Viscosity After 12 Days | | | c Viscosity Stability Behavior 12/1 Days $\phi$ | d Bulk Density g./l. |
|---|---|---|---|---|---|---|---|---|
| | 1/ | 10/ | 100 sec.$^{-1}$ | 1/ | 10/ | 100 sec.$^{-1}$ | | |
| (1) | 100 | 75 | 100 | 165 | 110 | 160 | 1.6 | 265 |
| (2) | 55 | 75 | 90 | 90 | 75 | 90 | 1.2 | 440 |

EXAMPLE 3

The process is conducted as in Example 1, with the following variations: The dispersion contains 2.0 percent n-dodecyl sulfate as the emulsifier (based on the PVC). The solids content is 49 percent, and the surface tension is 41 dyne/cm. The tower outlet temperature is 90°C. The spraying ratio amounts to 1.78 kg spraying air/kg dispersion; the output per nozzle is 118 kg of dispersion per hour.

Table 3 is set up analogously to Tables 1 and 2. The pastes were obtained by mixing 60 parts by weight of the respective PVC powder and 40 parts by weight of dioctyl phthalate.

TABLE 3

| | a Paste Viscosity After 1 Day | | | b Paste Viscosity After 12 Days | | | c Viscosity Stability Behavior 12/1 Days $\phi$ | d Bulk Density g./l. |
|---|---|---|---|---|---|---|---|---|
| | 1/ | 10/ | 100 sec.$^{-1}$ | 1/ | 10/ | 100 sec.$^{-1}$ | | |
| (1) | 800 | 250 | 90 | 1400 | 500 | 140 | 1.79 | 320 |
| (2) | 180 | 200 | 100 | 200 | 210 | 110 | 1.08 | 480 |

EXAMPLE 4

The process is carried out as described in Example 1, with the following differences: The dispersion contains 2 percent n-dodecyl sulfate and 0.5 percent alkyl polyglycol ether as the emulsifier, and has a solids content of 49 percent. The surface tension of the dispersion is 37 dyne/cm. The spraying ratio is 2.65 kg air/kg dispersion; the output per nozzle is 76 kg dispersion per hour.

Table 4 is compiled analogously to Tables 1–3 from pastes containing 65 parts by weight of PVC and 35 parts by weight of dioctyl phthalate.

TABLE 4

| | a Paste Viscosity After 1 Day | | | b Paste Viscosity After 12 Days | | | c Viscosity Stability Behavior 12/1 Days $\phi$ | d Bulk Density g./l. |
|---|---|---|---|---|---|---|---|---|
| | 1/ | 10/ | 100 sec.$^{-1}$ | 1/ | 10/ | 100 sec.$^{-1}$ | | |
| (1) | 700 | 380 | 200 | 1800 | 830 | 410 | 2.38 | 269 |
| (2) | 400 | 180 | 100 | 750 | 240 | 150 | 1.85 | 553 |

EXAMPLE 5

The procedure of Example 1 is followed, with the following variations: The dispersion contains 0.7 percent of a sodium laurate as the emulsifier. The solids content is 47 percent. The surface tension is 34 dyne/cm. The nozzle output is 105 kg of dispersion per hour at a spraying ratio of 1.9 kg air/kg dispersion.

Table 5 is prepared analogously to Tables 1–4. The pastes consist of 60 parts by weight of PVC and 40 parts by weight of dioctyl phthalate.

TABLE 5

| | a Paste Viscosity After 1 Day | | | b Paste Viscosity After 12 Days | | | c Viscosity Stability Behavior 12/1 Days $\phi$ | d Bulk Density g./l. |
|---|---|---|---|---|---|---|---|---|
| | 1/ | 10/ | 100 sec.$^{-1}$ | 1/ | 10/ | 100 sec.$^{-1}$ | | |
| (1) | 3000 | 600 | 200 | — | 1500 | 400 | 2.37 | 165 |
| (2) | 750 | 250 | 80 | 1200 | 380 | 140 | 1.59 | 377 |

EXAMPLE 6

A copolymer is produced from 95 percent of vinyl chloride and 5 percent of vinyl acetate by conventional emulsion polymerization. Then, the procedure is conducted as set forth in Example 1. The dispersion has a solids content of 48 percent and an emulsifier content of 2 percent by weight, based on the PVC. The emulsifier is an alkyl sulfonate. The spraying ratio is 2.3 kg of spraying air per kg of dispersion, and the nozzle output is 87 kg of dispersion per hour.

Table 6 is set up analogously to Tables 1–5. The pastes contain 35 parts by weight of dioctyl phthalate and 65 parts by weight of PVC.

TABLE 6

| | a Paste Viscosity After 1 Day | | | b Paste Viscosity After 12 Days | | | c Viscosity Stability Behavior 12/1 Days $\phi$ | d Bulk Density g./l. |
|---|---|---|---|---|---|---|---|---|
| | 1/ | 10/ | 100 sec.$^{-1}$ | 1/ | 10/ | 100 sec.$^{-1}$ | | |
| (1) | 2600 | 600 | 250 | 4500 | 1100 | 400 | 1.74 | 350 |
| (2) | 2000 | 400 | 150 | 3000 | 700 | 200 | 1.53 | 520 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. An atomizer suitable for spray-drying an aqueous vinyl chloride polymer dispersion, which comprises:
    a. a nozzle having a straight tubular air conduit with a rearward inlet half and a forward nozzle half; the tip of the nozzle half having its inner surface flared to an annular acute edge at the orifice discharge end of said nozzle half;
    b. a tubular polymer dispersion conduit having a rearward feed portion extending to a forward nozzle portion concentrically surrounding said air conduit, the end of said nozzle portion extending axially to and concentrically spaced from the acute edge of said air conduit, the inner surface of said nozzle portion being conically tapered towards said nozzle orifice discharge end at least coextensive with the flared portion of said nozzle half to a circular edge having a radius of 5 to 10 mm concentrically surrounding said acute edge to form therewith an annular orifice;
    c. a tubular tangential polymer dispersion inlet having a radius of less than 40 mm and a cross-sectional area of at least 80 mm$^2$, said inlet communicating tangentially with the feed portion of said polymer dispersion conduit; and
    d. said atomizer being further characterized by having a ratio of the radial distance of, i. the axis of said polymer dispersion tangential inlet, measured from the atomizer axis, to ii. the radius of said nozzle portion circular edge of from 1.5:1 to 4:1.

2. An atomizer according to claim 1, wherein said ratio (d) is from 2:1 to 2.5:1.

* * * * *